Sept. 23, 1947.　　　H. B. HOLTHOUSE　　　2,427,675
INTERNAL-COMBUSTION AIRCRAFT HEATING APPARATUS
Filed Nov. 13, 1943　　　3 Sheets-Sheet 1

INVENTOR
HARRY B. HOLTHOUSE
BY
*Norman L. Mueller*
ATTORNEY

Sept. 23, 1947.   H. B. HOLTHOUSE   2,427,675
INTERNAL-COMBUSTION AIRCRAFT HEATING APPARATUS
Filed Nov. 13, 1943   3 Sheets-Sheet 2

INVENTOR.
HARRY B. HOLTHOUSE
BY *Toorman L. Mueller*
ATTORNEY

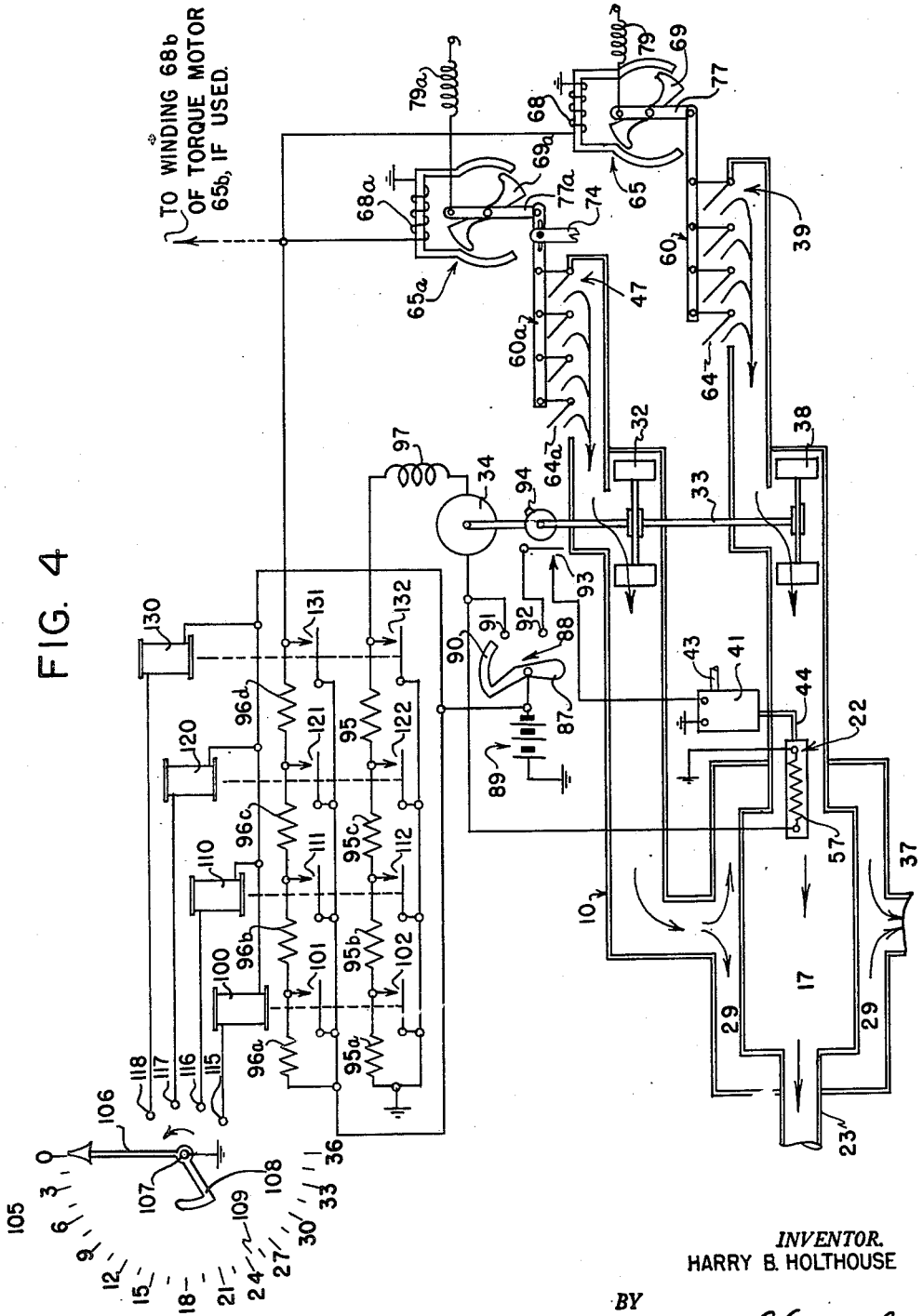

Patented Sept. 23, 1947

2,427,675

UNITED STATES PATENT OFFICE 2,427,675

INTERNAL-COMBUSTION AIRCRAFT
HEATING APPARATUS

Harry B. Holthouse, Chicago, Ill., assignor to
Motorola, Inc., a corporation of Illinois Application November 13, 1943, Serial No. 510,230

6 Claims. (Cl. 126—110)

The present invention relates to heating apparatus and more particularly to improvements in aircraft heaters of the internal combustion type adapted for uniformly reliable operation over a wide range of altitudes.

Many types of internal combustion heaters are available which will operate satisfactorily at the temperature and atmospheric pressure conditions prevailing at ground levels. In fact, certain of the commercially available heaters of this type are capable of operating with satisfaction at altitudes of approximately 15,000 feet. When this altitude is exceeded, however, the usual heater becomes unreliable and may become wholly inoperative, due to the reduced oxygen content in the rarefied atmospheres at high altitudes and the cold temperatures encountered at such altitudes.

It is an object of the present invention, therefore, to provide improved aircraft heating apparatus of the internal combustion type which is completely reliable in operation over a wide range of altitudes.

According to another object of the invention, an improved arrangement is provided for utilizing the altitude indicating device of the aircraft in which the heating apparatus is installed, i. e. the altimeter, to so control the flow of combustion air to the combustion chamber of the apparatus that an adequate quantity of combustion supporting oxygen is supplied regardless of the altitude at which the apparatus is operating.

In accordance with still another object of the invention, the desired automatic increase in combustion air flow with increasing altitude of heater operation is obtained by utilizing the altimeter of the craft in which the heater is installed to control the size of the combustion air inlet opening, the speed of the combustion air moving means, the size of the exhaust opening from the heater combustion chamber, or a combination of the named factors.

In accordance with a still further object of the invention, facilities are provided whereby the altimeter of the aircraft may also be utilized to control the rate of fuel feed to the combustion chamber inversely in accordance with the altitude of heater operation, thereby to obviate the possibility of combustion choking at the higher altitudes where the amount of oxygen per unit volume of combustion air delivered to the heater may be low.

According to a still further object of the invention, the facilities providing the identified controls are so arranged that they do not start to operate until a predetermined altitude is reached by the aircraft in which the heating apparatus is installed.

In accordance with still another object of the invention, the identified control facilities are so arranged that they in no way impair the indicating accuracy of the altimeter from which the directive controls are derived.

The invention, both as to its organization and method of operation, together with further objects and advantages, will best be understood by reference to the following specification taken in connection with the accompanying drawings, in which:

Fig. 4 is a diagrammatic view schematically illustrating the manner in which the electrical elements of the apparatus and the control facilities therefor are interconnected.

In practicing the present invention, there is provided heating apparatus of the internal combustion type arranged for the space heating of an aircraft while in flight. The apparatus includes a combustion chamber operatively associated with an air and fuel conditioning unit having heating means for heating the same to at least a fuel vaporizing temperature to mix together the air and fuel therein. The air to be heated is directed through a passage in thermal relation with the combustion chamber, with the means for circulating the air to be heated and for supplying the air for combustion to the conditioning unit, and hence to the combustion chamber, being operated by a common electric motor. The admission of air to the heated air passage and to the conditioning unit is controlled by adjustable valve means the operation of which is governed by the altimeter of the aircraft in which the apparatus is installed. Since the atmosphere becomes more rare and reduced in oxygen content with an increase in altitude, the valve means are controlled by the altimeter to permit more air to be moved by the air moving means with an increase in altitude, thereby to maintain the supply of oxygen to the conditioning unit substantially constant, and the rate of carrying away the heat from the combustion chamber substantially uniform. The increase in the quantity of air at high altitudes as controlled by the valve means is augmented by altimeter controlled means operated concurrently with the valve means to increase the speed of the motor with an increase in altitude. In those instances where it might be necessary to vary the fuel supply to the conditioning unit to maintain a substantially uniform air and fuel mixture at all altitudes, there is provided further altimeter controlled means for varying the fuel supply concurrently with the air supply after some predetermined altitude has been reached in which a variable fuel feed is desired. All of the above noted means for varying the air and fuel to compensate for the changes in the pressure and oxygen content in the atmospheres at high altitudes, are operatively assembled with the heater apparatus to provide in all a compact unit adapted for package handling.

Figure 1:
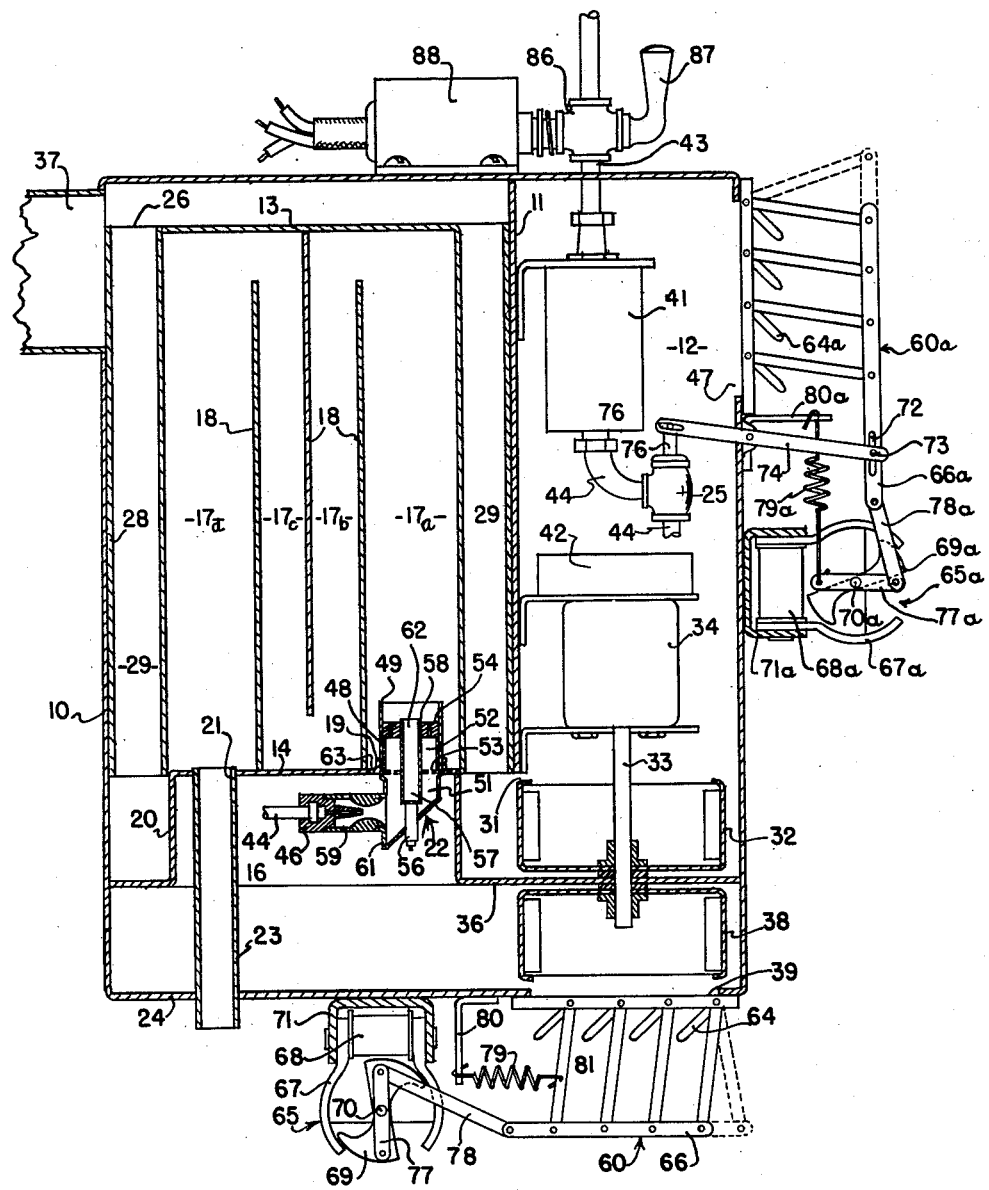
Fig. 1 is a longitudinal sectional view of heating apparatus illustrating the assembly therewith of facilities providing for its operation over a wide range of altitudes, and wherein the combustion chamber of the apparatus is shown in development for purposes of clarity.
Figure 2:
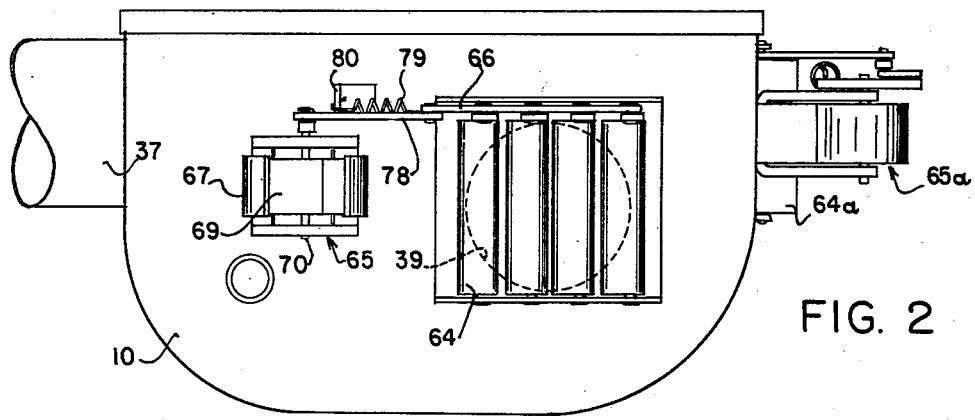
Fig. 2 is an end view of the apparatus shown in Fig. 1.

Referring now to the drawings and more particularly to Fig. 1 thereof, the present improved heater is illustrated as comprising a housing 10 which is divided longitudinally thereof over substantially its entire length by a vertically extending partition member 11 to provide a mechanical compartment 12 and a heating compartment. Within the heating compartment is a substantially cylindrically shaped combustion chamber 17, shown in development in Fig. 1 for the purpose of clarity, which is closed at one end by a cover plate 13 and at its opposite end by the bottom 14 of a substantially dish-shaped member 20 which defines in part an air supply chamber 16 in axial alignment with the combustion chamber 17.

Figure 3:
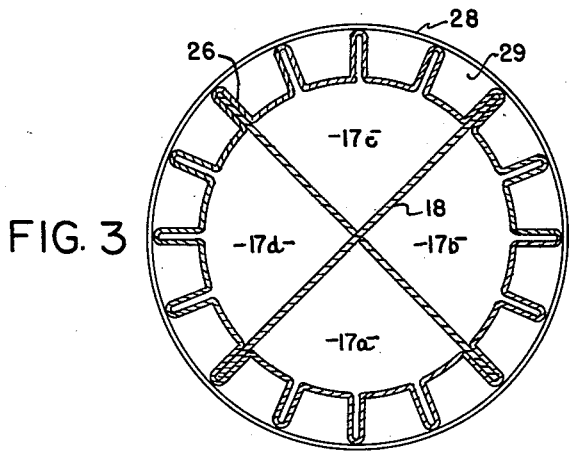
Fig. 3 is a sectional view of the combustion chamber provided in the apparatus shown in Fig. 1.

The combustion chamber 17 is divided longitudinally thereof into four axially extending but connected passages 17a—17d by a partition member 18 of substantially X-shape (Figs. 1 and 3). The combustion chamber inlet 19 and outlet 21 are formed in the bottom portion 14 of the dish-shaped member 20 in communication with the passages 17a and 17d, respectively. Located within the inlet 19 is an air and fuel mixing unit, indicated generally as 22, which is extended within the air supply chamber 16. The outlet 21 is provided with a tail pipe 23 extended through the air supply chamber 16 and outwardly from the heater at the housing end 24.

The outer wall or body portion of the combustion chamber 17 is provided with angularly spaced axially extending fins 26. These fins have a sleeve 28 positioned about the outer ends thereof to form an annular air circulating passage 29 surrounding the combustion chamber 17. Air to be heated is admitted into the passage 29 through an inlet 31 connecting the passage with the mechanical compartment 12 and is circulated through the passage 29 by a fan 32 located within the compartment 12 and mounted on the rotor shaft 33 of an electric motor 34 which is of series wound direct current type. The compartment 12 and air passage 29 are separated from the air supply chamber 16 by a sealing or partition member 36 extended transversely of the housing 10. From Fig. 1 of the drawings it will be seen that the air supply chamber 16 is defined by the member 20, the partition member 36, and the end 24 of the housing 10. Air circulated by the fan 32 is thus confined to travel within the compartment 12 and passage 29 and is discharged from the passage through an outlet 37 which is connected to a space to be heated.

The air supply chamber 16 receives air from a fan 38 located therein and mounted on the motor shaft 33 which is journaled in the partition plate 36. An inlet 39 for the fan 38 is provided in the housing end 24. It will be apparent, therefore, that the fans 32 and 38 are operated by the motor 34 and are mounted directly on the shaft 33 thereof. This motor 34 is also utilized to control the operation of a fuel pump 41 which is illustrated as being of solenoid type. More specifically, the breaker assembly 42 for controlling the energization of the pump 41 is operatively associated with the motor shaft 33. Fuel for the pump 41 is supplied thereto from a suitable source (not shown) through a pipe 43 and is delivered through a pipe 44 to a fuel injection nozzle 46 forming a part of the air and fuel mixing means 22. The pump 41, motor 34 and fan 32 are thus all located within the mechanical compartment 12, which is provided with an inlet 47 for supplying either fresh or recirculated air to the fan 32 for delivery to the air passage 29.

Briefly considered, the air and fuel mixing means 22 includes a casing member 48 which is closed at one end and opens into the passage 17a at the opposite end 49 thereof. A mixing chamber 51 is located at the closed end of the casing 48, and is separated from an equalizing chamber 52 by a perforated plate member 53. The equalizing chamber 52 in turn is both defined and separated from the combustion chamber passage 17a by a perforated heat insulating plate 54 spaced inwardly from the end 49 of the casing 48. Extended substantially axially through the casing 48 and supported in the partition plates 53 and 54 to project outwardly from the closed end of the casing 48 is a combination electric heating and igniting unit 56 which includes a resistance coil 57 supported in a spaced relation within a metal tube 58.

In the operation of the air and fuel mixing means 22, the fuel delivered to the nozzle 46 by the pump 41 is directed into the mixing chamber 51, the fuel nozzle being located within the air supply chamber 16 and mounted directly on the casing 48 to communicate with the mixing chamber 51. A portion of the air for mixing with the fuel enters the nozzle 46 from the air chamber 16 through ports 59 in the fuel nozzle and travels with this fuel into the mixing chamber 51. Additional air from the air chamber 16 is admitted directly into the mixing chamber 51 through apertures 61 formed in the casing 48 about the fuel injection nozzle 46. The fuel within the mixing chamber 51 is heated to at least a fuel vaporizing temperature by the combination unit 56 to facilitate its thorough mixing with the air. The casing 48, partition plate 53 and tube 58 are constructed of a good heat conducting material so as to readily transfer the heat radiated by the coil 57 to the air and fuel mixture. From the mixing chamber, the vaporous air and fuel mixture passes through the perforated plate 53 into the equalizing chamber 52 which in cooperation with the heat insulating plate 54 acts to reduce the turbulence in the mixture and to disperse the mixture substantially uniformly over the entire cross section of the casing 48. This combustible mixture then passes through the apertured plate 54 and across the open end 62 of the tube 58 into the effective igniting zone of the combination unit 56 which also acts as a heat gun. In other words, the heat developed by the coil 57, which is dependent upon the wattage input to the coil, is projected outwardly from the open end 62 of the tube 58 to ignite the combustible mixture without the mixture itself directly contacting the coil 57.

Admission of fuel to the pump 41 is controlled by a valve unit 86 which is connected in the supply line 43 and includes a valve actuating element 87. This element is extended through the body of the unit 86, is provided with an operating handle at one end, and is operatively connected at its opposite end with a control switch 88. The arrangement is such that upon movement of the actuating element 87 to fully close the valve unit 86, the switch 88 is operated to its open circuit position. More specifically and as best shown in Fig. 4 of the drawings, the switch 88 includes a pre-wiping contact arm 90 which is arranged to coact with a pair of separated contacts 91 and 92 to control the available circuits for energizing the fan driving motor 34, the operating magnet of the fuel pump 41, and the heating element 57 of the fuel conditioning unit 22.

For the purpose of variably controlling the size of the combustion air inlet opening 39, thereby to control the rate of combustion air delivery to the combustion chamber 17, a damper or valve assembly 60 is provided in association with this opening. In brief, this assembly comprises a plurality of louvers 64 connected to a common actuating member 66 for simultaneous movement to open and closed positions relative to the air inlet 39. The louvers 64 are normally biased to close the opening 39 through the action of a coil spring 79 which is connected between the louver actuating arm 81 and a bracket 80 carried by the wall 24 of the heater. Power for actuating the member 66 to variably open the louvers 64 against the force of the spring 79 is provided by a torque motor 65 which is also mounted upon the housing wall 24 by means of a mounting bracket 7. This motor includes the usual field structure 67 and magnetizing winding 68, and is provided with opposed pole faces within which a rotor 69 is supported for pivotal movement. More specifically, the rotor 69 is carried by a shaft 70 journaled within openings through the two sides of the bracket 71. At one end thereof, the shaft 70 rigidly mounts an arm 77 having an end connected to the actuating member 66 through a link 78. With this arrangement, sustained energization of the field magnet 68 with current of a predetermined magnitude serves to hold the rotor 69 in a set position, such that the louvers 64 are held in partially open positions against the tension of the biasing spring 79. Increased energization of this winding, serves to rotate the rotor 69 to a position more nearly in registry with the pole faces of the field structure, whereby the actuating member 66 is moved to actuate the louvers 64 in a direction to increase the effective size of the air admission opening 39.

A louver or valve assembly entirely similar to that just described is also provided for variably opening and closing the circulating air inlet opening 47. Corresponding parts of the two assemblies are identified by the same reference numerals, but are distinguished from each other by the use of the subscript $a$ in the identification of the parts of the assembly associated with the circulating air inlet opening 47. The damper assembly 60a and its associated torque motor 65a are also utilized to vary the rate of fuel feed to the inlet nozzle 46 of the fuel conditioning unit 22. To this end, a needle valve 25 is provided in the feed line 44 connecting the pump 41 with the nozzle 46. This valve includes an operating stem 76 connected for actuation by the member 66a through an operating lever 74. More specifically, the lever 74 is provided at its left end, as viewed in Fig. 1, with a slot which embraces a pin mounted transversely of the operating stem 76, and is mounted for rotation about an axis pin carried by the wall of the heater. This lever projects through a slot in the wall of the heater and is provided at its right end with a pin 73 which is disposed within a slot 72 formed in the actuating member 66a. By virtue of this arrangement, pivotal movement of the lever 74 to move the operating stem 76 of the valve 25 toward its closed or throttling position is not initiated until the actuating member 66a has been moved a predetermined distance from its normal position through operation of the torque motor 65a.

As previously indicated, the settings of the two torque motors 65 and 65a, as well as the speed of operation of the fan driving motor 34, are arranged for selective control in accordance with the altitude of operation of the craft in which the disclosed heating equipment may be installed. To this end, the aircraft may be provided with an altimeter 105 having an indexing pointer 106 which is mounted upon a pivotally supported actuating pin 107 to coact with the markings of a scale 109 for the purpose of indicating the altitude at which the craft is being operated. In the illustrated arrangement, the scale 109 is provided with markings which designate aircraft altitude in thousands of feet. The facilities provided for actuating the pivot pin 107 and the parts carried thereby may be of any conventional form. This pin not only carries the index pointer 106 but additionally supports a contact wiping arm 108 which rotates therewith and is arranged to cooperate with four contact points 115, 116, 117 and 118. The switching arrangement thus provided is utilized selectively to control four altitude indicating relays 100, 110, 120, and 130 which include contacts for rheostatically controlling the energization of the two torque motors 65 and 65a as well as the amount of current delivered to the field and rotor windings of the fan driving motor 34. These rheostatic facilities include series connected resistors 96 included in the circuit for energizing the parallel connected windings of the two torque motors 65 and 65a, and resistors 95 serially included in the circuit for energizing the fan driving motor 34.

In considering the operation of the system, it may first be pointed out that normally the parallel connected windings 68 and 68a of the two torque motors are energized from the aircraft battery 89 or other source of direct current over a circuit which includes the serially connected resistors 96. Accordingly, the rotors 69 and 69a of the two torque motors 65 and 65a are respectively set in positions such that the damper louvers 64 and 64a close the air inlet openings 39 and 47, respectively, to the required extent to permit entirely satisfactory combustion and air circulation for ground level operation of the heating apparatus. In other words, these louvers are held partially open through the action of the two torque motors to partially overcome the spring bias afforded by the two springs 79 and 79a, respectively. In order to start the heating equipment, the valve and switch operating element 87 is first operated to a position wherein the contact wiper arm 90 engages the contact 91. With the arm 90 in this position, an obvious circuit is completed for energizing the heating element 57 of the fuel conditioning unit 22 in parallel with a branch circuit which serially includes the resistors 95, the series winding 97, and the armature windings of the fan driving motor 34. Accordingly, the heating element 57 is heated to vaporize any fuel collected within the fuel conditioning unit 22, and the fan 38 is started in operation to scavenge the combustion chamber of any combustible products therein, all before operation of the fuel pump 41 is initiated to deliver fuel to the conditioning unit. After a short time interval, the switch and valve actuating element 87 may be thrown to the "run" position, wherein fuel is admitted to the inlet side of the pump 41 through the feed line 43. Also, in response to this operation, the contact wiping arm 90 and the contact 92 are engaged to energize the operating magnet of the fuel pump 41 through the intermittently closed contacts 93 which are actuated by the camming element 94 carried by the motor shaft 33. Accordingly, the fuel feed system is rendered operative to deliver fuel to the fuel conditioning unit 22. In this unit, the fuel is fully vaporized and mixed with the combustion air traversing the air inlet opening 39 and is discharged into the combustion chamber 17 for ignition, all in a manner which will be entirely apparent from the above explanation.

So long as the aircraft in which the illustrated heating equipment is installed is not operated at an altitude in excess of approximately 15,000 feet, the energization of the fan driving motor 34 is not changed and the respective settings of the louvers 64 and 64a are not altered. In this regard, it will be understood that since the motor 34 is of the series wound type, it will inherently seek a speed at which it is fully loaded. In other words, the motor seeks to retain a constant load thereon and, to this end, will change its speed of operation in response to tendencies of the load to increase or decrease. When the heating apparatus and more properly the aircraft in which this apparatus is installed is operated at altitudes ranging from 15,000 to 20,000 feet, the speeding up of the motor 34 resulting from the tendency of the load on the fans 32 and 38 to decrease with decreasing density of the air at such altitudes, is sufficient to compensate for the reduced air density, so that a substantially constant supply of oxygen is fed into the combustion chamber 17 through the fuel conditioning unit 22. Otherwise stated, the oxygen to fuel ratio of the combustible mixture which is supplied to the combustion chamber 17 is, through the full load seeking characteristic of the series motor 34, maintained sufficiently constant for satisfactory combustion over the specified altitude range. At altitudes in excess of 20,000 feet, however, the full load seeking characteristic of the motor 34 is not alone sufficient to maintain the proper oxygen to fuel ratio of the combustible mixture supplied to the combustion chamber. In short, at such altitudes the decreasing oxygen content per unit volume of air makes it necessary to increase the amount of air delivered to the combustion chamber by the combustion air moving fan 38 in order to maintain the proper combustible mixture. This is accomplished through the action of the altimeter control facilities to increase the speed of operation of the motor 34 and to increase the size of the air admission opening 39. More specifically, when the altitude of approximately 18,000 feet is reached, the pin 107 of the altimeter 105 is pivoted to a position wherein the brush 108 engages the contact 115 to complete an obvious circuit for energizing the relay 100 from the battery 89. In operating, this relay closes its contacts 101 to complete an obvious path for short-circuiting the resistor 96a and thus increase the current traversing each of the parallel connected windings 68 and 68a of the torque motors 65 and 65a. At its contacts 102, the relay 100 also completes an obvious path for short-circuiting the resistor 95a, thereby to increase the current traversing the windings of the fan motor 34. As a result of these switching operations, the speed of operation of the fan 34 is increased and the torque produced by each of the two torque motors 65 and 65a is also increased. The rotor 69 of the motor 65 accordingly is rotated through an additional angle against the tension of the spring 79 to further open the louvers 64 and thus increase the effective size of the air inlet opening 39. Thus, the relay 100 in its operation, effects a material increase in the amount of combustion air supplied to the combustion chamber 17 through the fuel condition unit 22, thereby compensating for the decrease in oxygen content of the air at the altitude at which the altimeter 105 directs this relay to operate. As the altitude of the craft is further increased to produce a corresponding indication by the altimeter 105, the contact wiping arm 108 is moved to a position where it bridges the two contacts 115 and 116, thus completing a circuit for energizing the relay 110 in parallel with the relay 100. In operating, the relay 110 closes its contacts 111 to shunt the two resistors 96a and 96b from the circuit for energizing the torque motor windings. At its contacts 112, the relay 110 also shunts the two resistors 95a and 95b, thereby further to increase the energization of the fan motor windings. As a result of these switching operations, the speed of the fan 38 is further increased concurrently with an additional increase in the effective area of the combustion air inlet opening 39. As the altitude of aircraft operation is further increased to cause a corresponding change in the setting of the altimeter pointer 106, the contact wiping arm is further rotated to disengage the contact 115 and thus deenergize the relay 100. Since, however, the relay 110 is operated, the release of the relay 100 to open its contacts 111 and 112 is without effect.

From the above explanation it will be understood that as the altitude of aircraft operation is progressively increased from the point at which energization of the relay 110 occurs, the two relays 120 and 130 are successively energized to produce successive increases in the energization of the fan motor 34 and the windings of the two torque motors 65 and 65a. As a result, the amount of combustion air delivered to the combustion chamber 17 by way of the fuel conditioning unit 22 is progressively increased in a step-by-step manner as the altitude of aircraft operation is increased above the 18,000 foot level at which the first relay 100 may be set to operate. It will also be understood from the above explanation that as each relay is successively energized, the preceding relay is not immediately deenergized. In other words, the relay 100 is only deenergized following energization of the relay 110, the relay 110 is only deenergized following energization of the relay 120, and so on. By virtue of this overlapping energization of the relays in response to an increasing altitude of aircraft operation, the energization of the motor 34 and the two torque motors is positively prevented from being returned to normal during an altitude change. It will also be understood that as the altitude of aircraft operation is decreased, the four relays 100, 110, 120 and 130 are energized and deenergized in reverse order to cause a progressive and step-by-step decrease in the size of the air inlet opening 39 and an accompanying decrease in the speed of operation of the fan motor 34, whereby the amount of combustion air supplied to the combustion chamber 17 is decreased in like manner.

At altitudes approaching 50,000 feet, it may be found necessary under some conditions to change the rate of fuel supply to the fuel conditioning unit 22. In this regard it will be apparent that the fuel is supplied to the conditioning unit at a rate which is dependent upon the speed of operation of the motor 34. Since this speed increases with increasing altitude of aircraft operation, the quantity of fuel supplied to the conditioning unit may result in a too rich mixture for satisfactory combustion being supplied to the combustion chamber 17 at the higher altitudes. To prevent this from occurring, the torque motor 65a is connected in the above-described manner to control the needle valve 25 so that when a certain altitude is exceeded, this valve is progressively closed to produce a progressive decrease in the amount of fuel delivered to the fuel conditioning unit 22. More specifically, when the torque motor 65a is operated to a position wherein the lower end of the slot 72, as viewed in Fig. 1 of the drawings, engages the pin 73, the valve actuating stem 76 will thereafter follow the movement of the actuating member 60a. This member is obviously moved in a direction to close the valve 25 with increasing energization of the torque motor winding 68a, so that the desired decrease in the fuel delivery rate is automatically obtained with increasing altitudes of operation. Obviously, the length of the slot 72 may be so related to the settings of the actuating member 66a corresponding to different altitudes of operation, that closure of the valve 25 may be started in response to operation of any one of the four relays 100, 110, 120, and 130.

Through the action of the above-described facilities for automatically controlling the fuel and combustion air delivery rates in accordance with changing altitude, the combustion conditions within the heater are maintained substantially uniform at all altitudes, thereby to provide for a substantially uniform generation of heat within the combustion chamber 17. Because of the reduction in the density of the air, it will be apparent that as the altitude of aircraft operation is increased, additional air must be circulated through the passage 29 to remove the generated heat for heating purposes. In other words, if the fan 32 were operated at a constant speed, the heat removed from the combustion chamber would necessarily decrease with an increase in altitude. The required increase in the quantity of air circulated through the passage 29, with increasing altitude of air craft operation, is attained to an appreciable extent by the speeding up of the motor 34 in the manner pointed out above. A further increase is obtained through the action of the damper assembly 60a automatically to increase the effective area of the circulating air inlet opening 47 with increasing altitude. In this regard it is pointed out above that at altitudes in excess of a predetermined height, the energization of the torque motor winding 68a is progressively increased under the control of the altimeter 105 and the associated control relays. Accordingly, the louvers 64a, which normally occupy partially closed settings, are progressively opened in response to the increasing torque developed by the motor 65a as the energization of its winding 68a is increased. It will be seen, therefore, that both the air and fuel supplied for combustion, as well as the air circulated through the passage 29, may be relatively varied under the control of the aircraft altimeter 105 in a manner such that the over-all operation of the heater remains substantially the same at all altitudes within a specified altitude range.

Figure 5:
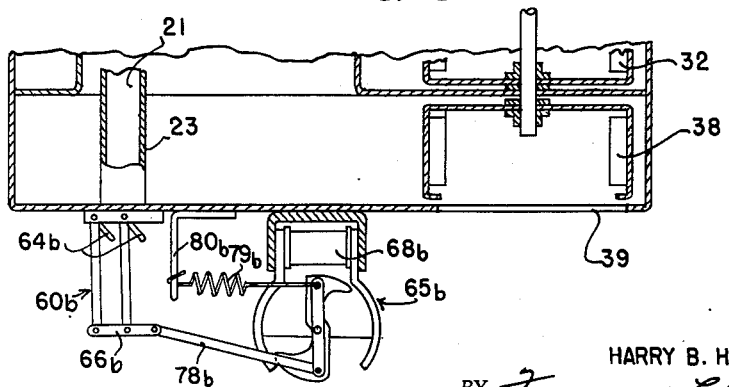
Fig. 5 is a fragmentary sectional view of the apparatus shown in Fig. 1 when equipped with additional means for controlling the flow of combustion air through the combustion chamber of this apparatus.

As described above with reference to the arrangement shown in Fig. 1 of the drawings, the air delivered to the combustion chamber 17 is controlled by the damper assembly 60 provided at the inlet opening 39 for the combustion air delivery fan 38. In the illustrated arrangement, the fans 32 and 38 are of the well-known sirocco type, which have the characteristic of falling off in air moving capacity when the air admitted thereto or delivered therefrom is closed off at either the inlet or the outlet sides thereof. Some propeller type fans also have this characteristic. Accordingly, the load on the motor 34 relative to the fan 38 may be varied either by controlling the air flow through the inlet opening 39 or the exhaust gas flow through the combustion chamber outlet opening 21. If the latter type of control is to be employed, an arrangement of the character illustrated in Fig. 5 of the drawings may be utilized. As there shown, a damper assembly 60b entirely equivalent in construction and operation with the assembly 60, and having corresponding parts identified by the same reference characters, is utilized variably to close the exhaust openings 21 from the combustion chamber 17. If this arrangement is utilized, the operating winding 68b of the torque motor 65b may be connected in parallel with one or both of the torque motors 65 and 65a in the manner indicated by the dash line conductor shown in Fig. 4 of the drawings.

In the operation of the damper assembly 60b and its associated torque motor 65b, the louvers 64b are maintained in a substantially closed position when the heater is at ground level, whereby the air moved by the fan 38 is less than it would be if the fan were operated with the louvers in a fully opened position. The louvers 64b are, however, normally opened a predetermined amount in order to provide for proper operation of the heater at ground levels. As the altitude of heater operation is increased, the torque motor 65b functions progressively to move the louvers 64b to a wide open position, thereby to permit an increased flow of air through the combustion chamber 17 due to the increased air moving capacity of the fan 38 and the increased speed of operation of the fan motor 34. In other words, above a certain altitude, the outlet opening 21 for the combustion chamber 17 is gradually increased in size with an increase in altitude so that more air is admitted to the combustion chamber at rarefied atmospheres to maintain the oxygen supply to the combustion chamber substantially constant.

In the control of the air supplied to the combustion chamber 17, the exhaust tail pipe 23 is, in the Fig. 1 arrangement, left entirely open. It is apparent of course that in the operation of the heater at high altitudes, a reduction in the back pressure occurs because of the rarefied atmosphere. Stated othrewise, the exhaust from the combustion chamber acts against a smaller pressure at higher altitudes than at ground levels. Since this reduction in back pressure occurs concurrently with an increase in the speed of operation of the fan motor 34, an increased velocity head is produced in the combustion chamber 17 concurrently with a decrease in the static back pressure. Thus, although a greater quantity of air is supplied to the combustion chamber 17, this air operates against a reduced back pressure in the combustion chamber with a resultant increase in velocity, as compared with the velocity prevailing at ground levels. Under certain operating conditions, this velocity may attain proportions such that insufficient time is provided for complete combustion of the combustible mixture introduced into the combustion chamber. To obviate this condition and to provide for the operation of the heater with combustion chamber pressure conditions which remain substantially the same at all altitudes, the damper assembly 60b and associated torque motor 65b may be reversely associated with the exhaust end of the tail pipe 23 to progressively close the louvers 64b as the altitude of aircraft operation is increased. The manner in which this may be accomplished will be clearly apparent from the foregoing explanation.

From the above description it will be understood that the present invention provides for aircraft heating apparatus of the internal combustion type which is adapted to operate over a wide altitude range while maintaining substantially uniform operating conditions. It will be seen further that the control facilities for the combustion air, the fuel supply system, and the circulating air are actuated in accordance with the altitudes at which the apparatus is being operated in an entirely automatic manner through the action of the altimeter with which the aircraft is equipped. As a result, exceedingly accurate control of these facilities is obtained without duplication of the altitude indicating equipment. In this regard it is pointed out that since the four control relays 100, 110, 120 and 130 only require an exceedingly small current flow through the respective windings thereof to effect operation thereof, the contacts 115, 116, 117, and 118 wiped by the contact arm or brush 108 may be exceedingly small. Further, the contact pressure required to make and break the relay circuits is likewise very small. As a result, the altimeter controlled switching arrangement may easily be devised to perform its several control functions without in any way detracting from the indicating accuracy of the instrument.

While one embodiment of the invention has been disclosed, it will be understood that various modifications may be made therein, which are within the true spirit and scope of the invention.

I claim:

1. In an aircraft which includes an altimeter having an arm for indicating the altitude at which the craft is flying; heating apparatus including means defining a combustion chamber, means for delivering combustion air to said chamber, a plurality of relays controlled by said arm to operate at different altitudes of flight of said aircraft, and means controlled by said relays for varying the volume of combustion air delivered to said combustion chamber in a step-by-step manner and in accordance with the altitude at which said aircraft is operated.

2. In an aircraft heating system having a combustion chamber and means for delivering a varying volume of combustion air to said chamber; a plurality of relays, means for selectively energizing said relays as the altitude at which said system is operated is changed, and means controlled by said relays for varying the volume of air supplied to said combustion chamber by said air delivery means in a step-by-step manner and in accordance with the altitude at which said aircraft is operated.

3. In an aircraft which includes an altimeter having an arm for indicating the altitude at which the craft is operating; heating apparatus including means defining a combustion chamber, means defining a passage for admitting combustion air to said chamber, valve means for variably opening and closing said passage, a fuel feed system for delivering fuel to said chamber, valve means included in said system to control the rate of fuel delivery to said combustion chamber, variable torque motors respectively operative to actuate said valve means, a plurality of relays arranged for selective energization under the control of said altimeter arm in response to changes in the altitude at which said aircraft is operated, and means controlled by said relays for so controlling the energization of said motors that a substantially uniform mixture of fuel and air is delivered to said chamber regardless of the altitude at which said aircraft is operated.

4. In an aircraft which includes an altimeter having an arm for indicating the altitude at which the craft is operating; heating apparatus including means defining a combustion chamber, a fuel feed system for delivering fuel to said chamber, valve means included in said system to control the rate of fuel delivery to said combustion chamber, a variable torque motor operative to actuate said valve means, a plurality of relays controlled by said altimeter arm for selective energization in response to changes in the altitude at which said aircraft is operated, and means controlled by said relays for so controlling the energization of said motor that the supply of fuel is decreased with an increase in the altitude at which said craft is operated.

5. In an aircraft which includes an altimeter having an arm for indicating the altitude at which the craft is operating; heating apparatus including means defining a combustion chamber, means defining a passage for admitting combustion air to said chamber, valve means for variably opening and closing said passage, air moving means for supplying air to said passage, an electric motor for driving said air moving means, a variable torque motor operative to actuate said valve means, a plurality of relays arranged for selective energization under the control of said altimeter arm in response to changes in the altitude at which said aircraft is operating, and means controlled by said relays for controlling the energization of said electric motor and said variable torque motor for concurrently operating the same to increase the power applied to said air moving means and increase the opening of said passage with an increase in altitude.

6. In an aircraft which includes an altimeter having an arm for indicating the altitude at which the craft is operating; heating apparatus including means defining a combustion chamber, means defining a chamber for providing air to said combustion chamber having an inlet opening, means defining an air heating chamber having an inlet opening and arranged in heat exchange relationship with said combustion chamber, a fuel feed system for delivering fuel to said combustion chamber, valve means included in said system to control the rate of fuel delivery to said combustion chamber, air moving means for moving air from the inlet openings to said chambers, an electric motor for driving said air moving means, said motor having the characteristic of speeding up as the density of the air moved by said air moving means is decreased at increasing altitudes, whereby the volume of air moved by said air moving means tends to increase with increasing altitude of operation of said craft, adjustable damper means respectively provided at said openings to control the volume of air flow thereto, a first variable torque motor for controlling the damper means at said combustion chamber air inlet opening, a second variable torque motor for controlling said valve means and the damper means at said air heating chamber inlet opening, a plurality of relays arranged for selective energization under the control of said altimeter arm in response to changes in the altitude at which said aircraft is operated, and means controlled by said relays for so controlling the energization of said electric motor and said first and second variable torque motors to increase the volume rate of air delivery to said combustion chamber and heating chamber and for changing the rate of fuel delivery to said combustion chamber with an increase in the altitude of aircraft operation.

HARRY B. HOLTHOUSE.

REFERENCES CITED

The following references are of record in the file of this patent:

UNITED STATES PATENTS

| Number | Name | Date |
| --- | --- | --- |
| 1,961,790 | Roth et al. | June 5, 1934 |
| 2,337,476 | Landon et al. | Dec. 21, 1943 |
| 1,562,663 | Strong | Nov. 24, 1925 |
| 2,063,477 | Young et al. | Dec. 8, 1936 |
| 2,314,089 | Hess et al. | Mar. 16, 1943 |
| 2,309,034 | Gregg et al. | Jan. 19, 1943 |
| 2,264,347 | Udale | Dec. 2, 1941 |
| 2,315,715 | Leibing | Apr. 6, 1943 |
| 2,285,672 | McCollum | June 9, 1942 |
| 2,364,214 | Hess et al. | Dec. 5, 1944 |